(No Model.)  3 Sheets—Sheet 1.

J. E., D. A. & T. E. LEE.
MINING MACHINE.

No. 563,776.  Patented July 14, 1896.

Witnesses
G. Shoemaker
J. F. Riley

Inventors
James E. Lee,
David A. Lee and
Thomas E. Lee.

By their Attorneys,
C. A. Snow & Co.

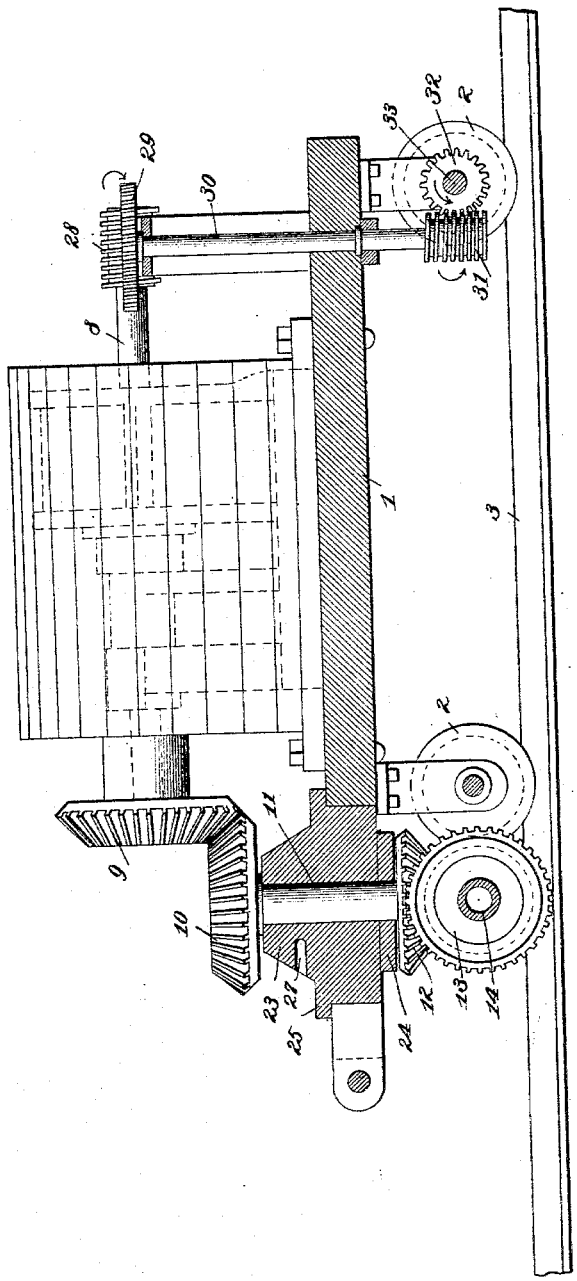

(No Model.)  
3 Sheets—Sheet 3.

J. E., D. A. & T. E. LEE.
MINING MACHINE.

No. 563,776.  Patented July 14, 1896.

Witnesses  
Inventors  
James E. Lee,  
David A. Lee and  
Thomas E. Lee.  
By their Attorneys,

UNITED STATES PATENT OFFICE.

JAMES E. LEE, DAVID A. LEE, AND THOMAS E. LEE, OF CENTREVILLE, IOWA.

MINING-MACHINE.

SPECIFICATION forming part of Letters Patent No. 563,776, dated July 14, 1896.

Application filed August 19, 1895. Serial No. 559,821. (No model.)

*To all whom it may concern:*

Be it known that we, JAMES E. LEE, DAVID A. LEE, and THOMAS E. LEE, citizens of the United States, residing at Centreville, in the county of Appanoose and State of Iowa, have invented a new and useful Mining-Machine, of which the following is a specification.

The invention relates to improvements in mining-machines.

The object of the present invention is to improve the construction of mining-machines, and to provide a simple and efficient one, adapted to feed itself automatically and capable of cutting horizontally and of clearing the cut of the coal-dust or substance under the coal, resulting from the cutting operation.

The invention consists in the construction and novel combination and arrangement of parts hereinafter fully described, illustrated in the accompanying drawings, and pointed out in the claims hereto appended.

Figure 1:
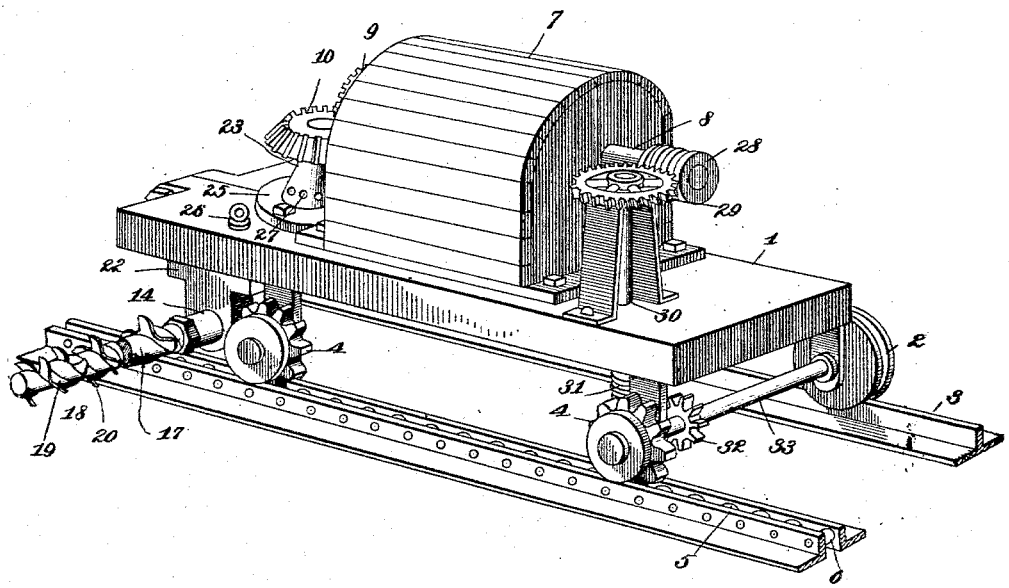
Figure 5:
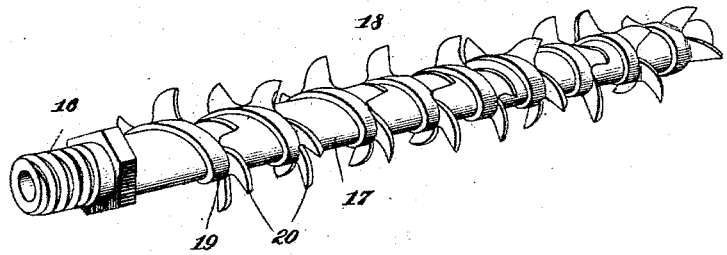
Figure 4:
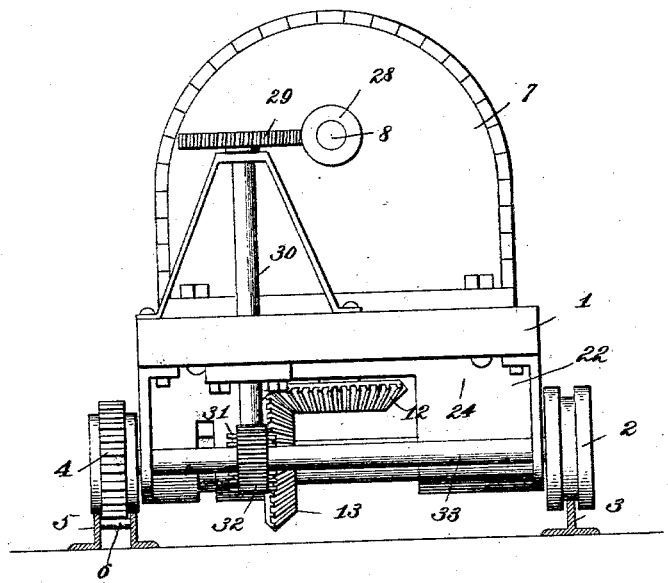
Figure 3:
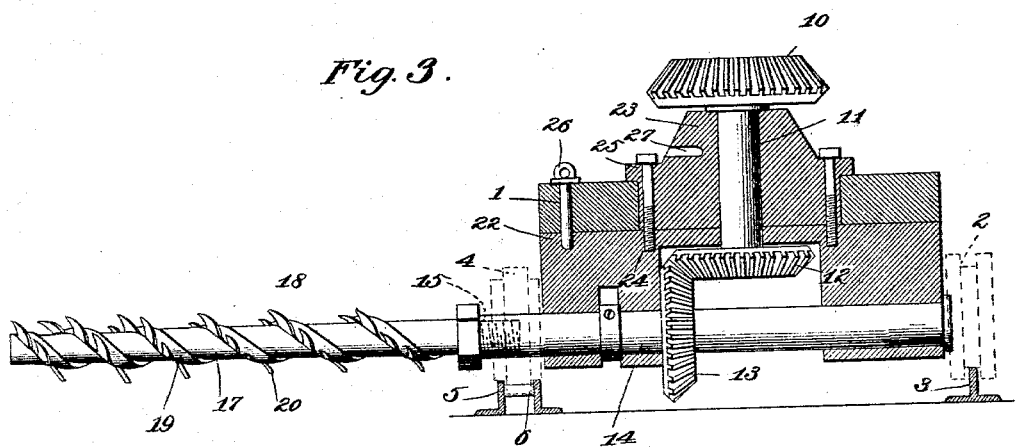

In the drawings, Figure 1 is a perspective view of a mining-machine constructed in accordance with this invention. Fig. 2 is a vertical longitudinal sectional view, the motor being shown in elevation. Fig. 3 is a transverse sectional view taken longitudinally of the cutter. Fig. 4 is a rear elevation. Fig. 5 is an enlarged detail perspective view of the cutter.

1 designates a carriage provided at one side with grooved wheels 2, run on a rail 3, and having at its opposite side toothed wheels 4, adapted to run on a rack-bar 5, forming the other rail. The rack-bar 5 may be constructed in any suitable manner, but is preferably composed of two angle-irons L-shaped in cross-section, and transverse fastening devices 6, arranged at intervals and connecting the vertical flanges of the sides or angle-irons, and adapted to be engaged by the teeth of the wheels 4, which has smooth treads at opposite sides of the teeth to run on the upper edges of the vertical flanges of the angle-irons.

The carriage 1 may be of any desired construction, and it has mounted on it a motor 7, of any preferred form, which is suitable for driving a longitudinal shaft 8. The shaft 8 is connected at its front end by beveled gear-wheels 9 and 10 with a vertical shaft 11, and the latter has its lower end connected by similar gear-wheels 12 and 13 with a transverse cutter-shaft 14.

The cutter-shaft 14 is provided at its outer end with a socket 15, interiorly threaded and receiving a threaded inner end 16 of a bar or core 17 of a cutter 18. The cutter 18 extends laterally from the carriage, and is horizontal, and consists of the said bar or core 17, which is round and tapering, and a continuous band 19, spirally coiled around the core and provided at intervals with projecting teeth 20, arranged in a spiral line or series and adapted to operate on coal or substance under the coal, and also forming a spiral conveyer adapted to feed the coal dust or dirt resulting from the cutting operation outward to clear the cut to avoid clogging the machine and to facilitate rapid cutting. This construction forms a tapering cutter, which is capable of rapidly cutting its way through a bank of coal or other substance.

The band 19 is arranged flat on the core, and the teeth are located at the front edge of the band and lie entirely beyond the same, being provided with front cutting edges and convexly-curved rear edges.

The front vertical shaft 11 is swiveled to the frame of the carriage by a bearing-bracket 22, which permits the cutter to be turned at any desired angle and to be thrown from one side of the machine to the other. The bearing-bracket 22 is composed of an upper portion 23, forming a stand and mounted on the frame of the carriage, and projecting above the same, and a lower portion 24, extending transversely of the frame of the carriage and located beneath the same, and connected with the upper portion by suitable fastening devices.

The upper portion of the bracket has a circular bottom to fit in a corresponding opening of the frame of the carriage, and it is provided with a projecting flange 25, resting upon the upper face of the carriage. The lower portion of the bearing-bracket is provided with suitable bearings for the cutter-shaft, and it is secured at right angles to the frame by a bolt 26 or other suitable fastening or locking device, and the bolt is adapted to be removed to permit the cutter to be swung around and adjusted while the machine is in motion. In order to enable the bearing-bracket to be readily rotated, it is provided with a series of sockets 27, adapted to receive a suitable tool.

In order to feed the machine forward automatically, the rear toothed wheel is connected by gearing with the longitudinal motor-shaft, and as the motor-shaft is rotated to effect the operation of cutting, it also rotates the rear toothed wheel and gradually advances the machine, feeding the cutter forward. The rear end of the motor-shaft is provided with a worm 28, which meshes with a gear-wheel 29 of a rear vertical shaft 30, and the latter is provided at its lower end with a worm 31, which meshes with a pinion 32 of the rear axle 33, the rear toothed wheel being fixed to the axle. This construction causes a slow, steady, automatic feeding of the machine, and by reversing the rotation of the cutter the machine may be moved backward.

It will be seen that the mining-machine is simple and comparatively inexpensive in construction, that it is especially adapted for operating on coal and other substance, and that it is self-cleaning and is fed forward automatically.

Changes in the form, proportion, and the minor details of construction may be resorted to without departing from the principle or sacrificing any of the advantages of this invention.

What we claim is—

1. In a mining-machine, a cutter comprising a core and a continuous spirally-coiled band wound around the core and arranged flat against the same, and provided at its front edge with outwardly-projecting teeth, formed integral with the band and arranged at intervals at each coil thereof and lying beyond the outer face of the band, and provided with front cutting edges and having their rear edges convexly curved, substantially as described.

2. In a mining-machine, the combination of a carriage, a motor mounted on the carriage, a horizontal drive-shaft extending in advance and in rear of the motor and provided at its front end with a gear-wheel 9 and having at its rear end a worm 28, a vertical shaft 11 located in advance of the motor and provided at its upper and lower ends with gear-wheels 10 and 12, the upper gear-wheel 10 meshing with the gear-wheel 9 of the drive-shaft, a horizontal cutter-shaft extending laterally from one side of the carriage and provided at its inner end with a gear-wheel meshing with the gear-wheel 12 at the lower end of the shaft 11, a pinion mounted on the rear axle of the carriage, and a vertical shaft 30 located in rear of the motor and provided at its upper end with a gear-wheel and at its lower end with a worm, meshing respectively with the worm 28 of the drive-shaft and with the pinion of the rear axle, substantially as and for the purpose described.

In testimony that we claim the foregoing as our own we have hereto affixed our signatures in the presence of two witnesses.

JAMES E. LEE.
DAVID A. LEE.
THOMAS E. LEE.

Witnesses:
J. A. BRADLEY,
J. O. BEVINGTON.